(12) United States Patent
Bornheim et al.

(10) Patent No.: US 6,662,727 B2
(45) Date of Patent: Dec. 16, 2003

(54) GAS GENERATOR, IN PARTICULAR FOR BELT TIGHTENERS

(75) Inventors: Wilhelm Bornheim, Troisdorf (DE); Gunther Faber, Siegburg (DE); Friedrich Heinemeyer, Siegburg (DE); Helmut Zollner, Meerbusch (DE)

(73) Assignees: Dynamit Nobel GmbH, Troisdorf (DE); Explosivstoff-und Systemtechnik, Troisdorf (DE)

( * ) Notice: Subject to any disclaimer, the term of this patent is extended or adjusted under 35 U.S.C. 154(b) by 0 days.

(21) Appl. No.: 09/895,064

(22) Filed: Jul. 2, 2001

(65) Prior Publication Data

US 2002/0007756 A1 Jan. 24, 2002

Related U.S. Application Data

(63) Continuation-in-part of application No. 09/142,207, filed as application No. PCT/EP97/01249 on Mar. 12, 1997.

(30) Foreign Application Priority Data

Mar. 14, 1996 (DE) .......................... 196 09 908

(51) Int. Cl.⁷ .......................... B60R 21/26; F42C 19/12
(52) U.S. Cl. ................ 102/530; 102/202.5; 102/202.9; 102/202.14; 280/741
(58) Field of Search .............. 102/202.1, 202.2, 102/202.5, 202.7, 202.11, 530, 531, 202.9, 202.14; 280/741

(56) References Cited

U.S. PATENT DOCUMENTS

| | | | |
|---|---|---|---|
| 2,695,562 A | 11/1954 | Mulqueeny | |
| 2,963,971 A | 12/1960 | Horne | 102/202.1 |
| 3,318,243 A | 5/1967 | Miller | 102/202.7 |
| 3,414,292 A | 12/1968 | Olderg et al. | 102/202.2 |
| 3,640,223 A | 2/1972 | Olsson | 102/202.11 |
| 3,804,018 A | 4/1974 | Janoski | 102/202.1 |
| 4,517,895 A | 5/1985 | Rucker | 102/202.2 |
| 4,690,056 A | 9/1987 | Brede | 102/202.2 |
| 4,696,231 A | 9/1987 | Bryan | 102/202.5 |
| 4,730,558 A | 3/1988 | Florin | 102/202.7 |
| 5,337,674 A * | 8/1994 | Harris et al. | 102/530 |
| 5,394,801 A | 3/1995 | Faber | 102/202.11 |
| 5,596,163 A | 1/1997 | Caflisch | 102/202.2 |
| 5,634,660 A | 6/1997 | Fink | 280/741 |
| 5,763,814 A | 6/1998 | Avory | 102/202.7 |
| 6,302,023 B1 * | 10/2001 | Wier | 102/202.2 |
| 2002/0078848 A1 * | 6/2002 | Duvacquier et al. | 102/202.2 |

FOREIGN PATENT DOCUMENTS

| | | |
|---|---|---|
| DE | 4307774 | 9/1994 |
| DE | 4324554 | 1/1995 |
| DE | 29709390 | * 11/1997 |
| EP | 488936 | 11/1991 |
| GB | 2083174 | 3/1982 |

* cited by examiner

*Primary Examiner*—Harold J. Tudor
(74) *Attorney, Agent, or Firm*—Antonelli, Terry, Stout & Kraus, LLP

(57) ABSTRACT

According to the invention, in order to be able to design a gas generator, in particular, for belt tighteners, with a slim housing (1), the electrical coupling is brought about via connection wires (4), pins or cables (4*a*) which are introduced into the housing (1) via a stopper (5) and are sealed by the latter. The stopper (5) is surrounded sealingly by the housing (1) itself or a holder element (6) sealingly connected to the housing.

11 Claims, 5 Drawing Sheets

US 6,662,727 B2

GAS GENERATOR, IN PARTICULAR FOR BELT TIGHTENERS

This application is a continuation-in-part of application Ser. No. 09/142,207, filed Feb. 23, 1999 which is a 371 Of PCT/EP97/01249 Mar. 12, 1997.

BACKGROUND OF THE INVENTION

The invention relates to a gas generator, in particular for belt tighteners.

Pressure elements for use in belt tighteners of motor vehicles are known from DE 43 07 774 A1. Buckle tighteners or belt-roller winders are generally understood by the term belt tighteners. These pressure elements, called gas generators in the following, consist of a housing in which are arranged, inter alia, a propellent charge for generating a pressure gas and an igniter. In addition, in order to improve the ignition, it is also possible to provide a propagation charge between the igniter and propellent charge. The igniter or igniting element is provided with a socket. The housing embraces this socket or an additional portion and presses it in a sealing manner against the housing wall. A plug is plugged into the socket from the outside for the purposes of electrical coupling. Thus, the igniter is electrically connected by way of the plug to a control unit located outside the gas generator.

It is also known to integrate in the plug a form of protection against electromagnetic action.

A disadvantage of this pressure element or gas generator is the comparatively great outlay that is required for its assembly. The use of a socket/plug combination limits the minimum diameter of the gas generator.

SUMMARY OF THE INVENTION

The underlying object of the invention is to develop further a gas generator in such a way that it can be produced with a small diameter.

According to the invention this object is achieved
- by having the electrical coupling take place by way of connecting wires, or pins, or cables which are inserted into the housing by way of a stopper and which are sealed by the latter, and
- by having the stopper surrounded in a sealing manner by the housing itself or by a holding element which is connected to the housing in a sealing manner.

The use of connecting wires or pins, or cables, which are inserted into the interior of the housing by way of a stopper, substantially simplifies the sealing of the gas generator, since the stopper is, at the same time, used for sealing purposes.

The stopper preferably consists of a synthetic rubber or plastics material. Examples of materials are styrene-butadiene-rubber (SBR), acrylonitrile rubber (NBR) or fluorinated rubber (FPM). The connection of the stopper with the housing is effected by suitable measures, such as crimping, adhesion or potting. Crimping has proved to be particularly advantageous.

The stopper is preferably pushed, sprayed or vulcanized onto the connecting wires or pins or the cable.

Advantageously, electronic components or a printed circuit board can be arranged in the interior of the housing as connecting elements or as a connecting element between the igniter and the connecting wires or pins. Suitable electronic components or active or passive circuit arrangements can be arranged on the printed circuit board in order to bring about protection against electromagnetic action. Likewise, the electronic connecting element can be formed as a switch or a safety element.

In an alternative advantageous embodiment, the igniter is directly connected to the connecting wires or pins. In this connection it is advantageous to integrate a form of protection against electromagnetic action and/or a switch and/or a safety element in the igniter.

The type of or the form of the igniter is not pre-set. Ignition caps are best suited to each case. Ignition caps in bar form or with a copper-clad pole body, which can be used to accommodate electronic components, are preferred. Ignition caps are described in DE 42 36 729 A1, for example.

To protect against electrostatic phenomena, the housing advantageously has an inwardly directed channel formation in the area of the electrical supply lines as a desired spark gap. The igniter is advantageously embedded in an insulating sleeve or in a protective tube. In addition to protecting the igniting material from electrostatic discharges, in this way no damage as a result of vibrations results at the igniter. This applies especially to ignition caps.

In order to be able to configure the guiding of the connecting wires or pins or the cable in a variable manner, in a preferred embodiment a cable guide is arranged at the end face of the gas generator at which the connecting wires or pins or the cable are inserted. This cable guide is advantageously sprayed thereon or fusion-cast.

Furthermore, the housing suitably has predetermined breaking points either on the base or on the housing wall.

BRIEF DESCRIPTION OF THE DRAWINGS

Further features of the invention follow from the figures which are described in the following and in which.

DETAILED DESCRIPTION OF THE PREFERRED EMBODIMENT

Figure 1:
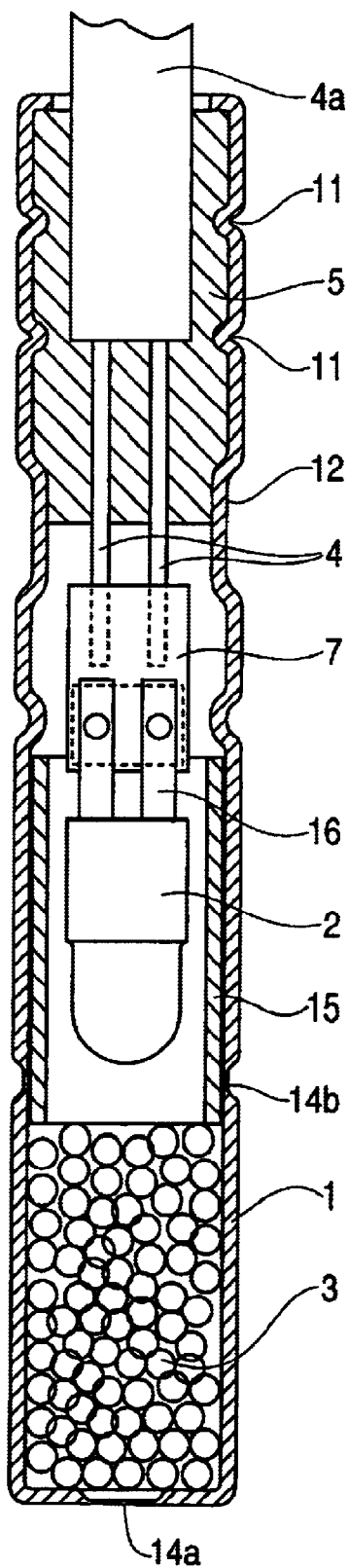
FIG. 1 shows, in section, a preferred embodiment of a gas generator in accordance with the invention that is of an extremely slender structural design.

FIG. 1 shows a gas generator in accordance with the invention for use with belt tighteners. The gas generator consists of a cylindrical housing 1. Arranged at one end face is a propellent charge 3 which generates pressure gas after ignition by means of an igniter 2. A booster charge or propagation charge can also be provided upstream of the propellent charge 3. The propellent charge can consist, for example, of nitrocellulose or a propellent which does not generate carbon monoxide, such as known, for example, from EP 0 519 485 AI.

The igniter 2, here an ignition cap, which projects into an insulating sleeve 15, is located upstream of the propellent charge 3. The electrical connecting bars 16 of the igniter 2 are connected to, for example soldered onto, a printed circuit board 7. Connecting wires 4 of an electrical cable 4a are soldered onto said printed circuit board at the side of the printed circuit board 7 opposite the connecting bars 16. The printed circuit board 7 is accordingly used as a connecting element between the igniter 2 and the connecting wires 4 or the cable 4a.

These connecting wires 4 or the cable 4a are guided out of the housing 1 at an end face. Sealing is effected by way of a stopper 5 through which the connecting wires 4 or the cable 4a are/is guided. The stopper 5 completely fills up the end face of the housing 1. Securing is effected by crimping 11 at various points.

A defined break-up of the generator is possible either as a result of predetermined breaking points 14a on the base or as a result of predetermined breaking points 14b in the housing wall.

Located in the area of the electrical connecting wires in the housing 1 there is an inwardly directed, annular channel formation 12. This channel formation 12 is used as protection against electrostatic phenomena, if the housing 1 is advantageously made of metal.

Figure 4:
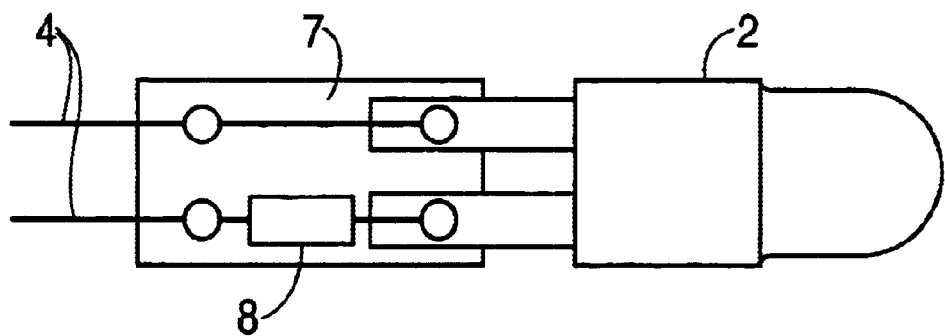
FIG. 4 shows diagrammatically the printed circuit board with a coil.
Figure 5:
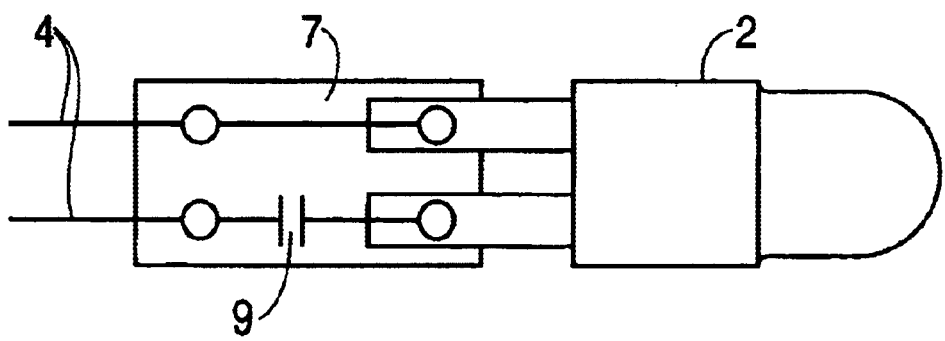
FIG. 5 shows diagrammatically the printed circuit board with a capacitor.
Figure 6:
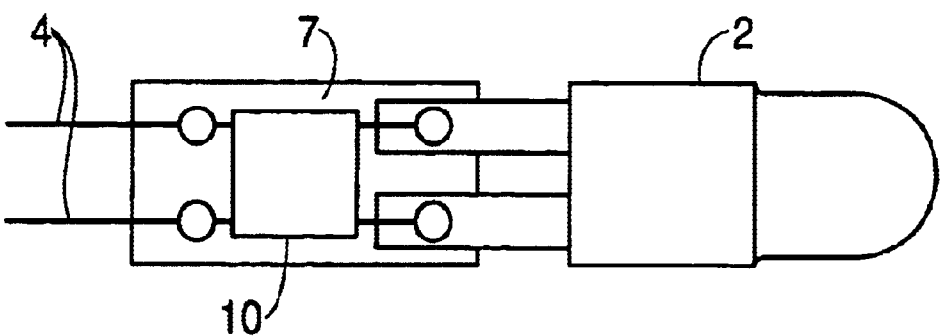
FIG. 6 shows diagrammatically the printed circuit board with an active or a passive circuit arrangement.

Protection against electromagnetic action is advantageously provided on the printed circuit board (see FIGS. 4–6).

Figure 2:
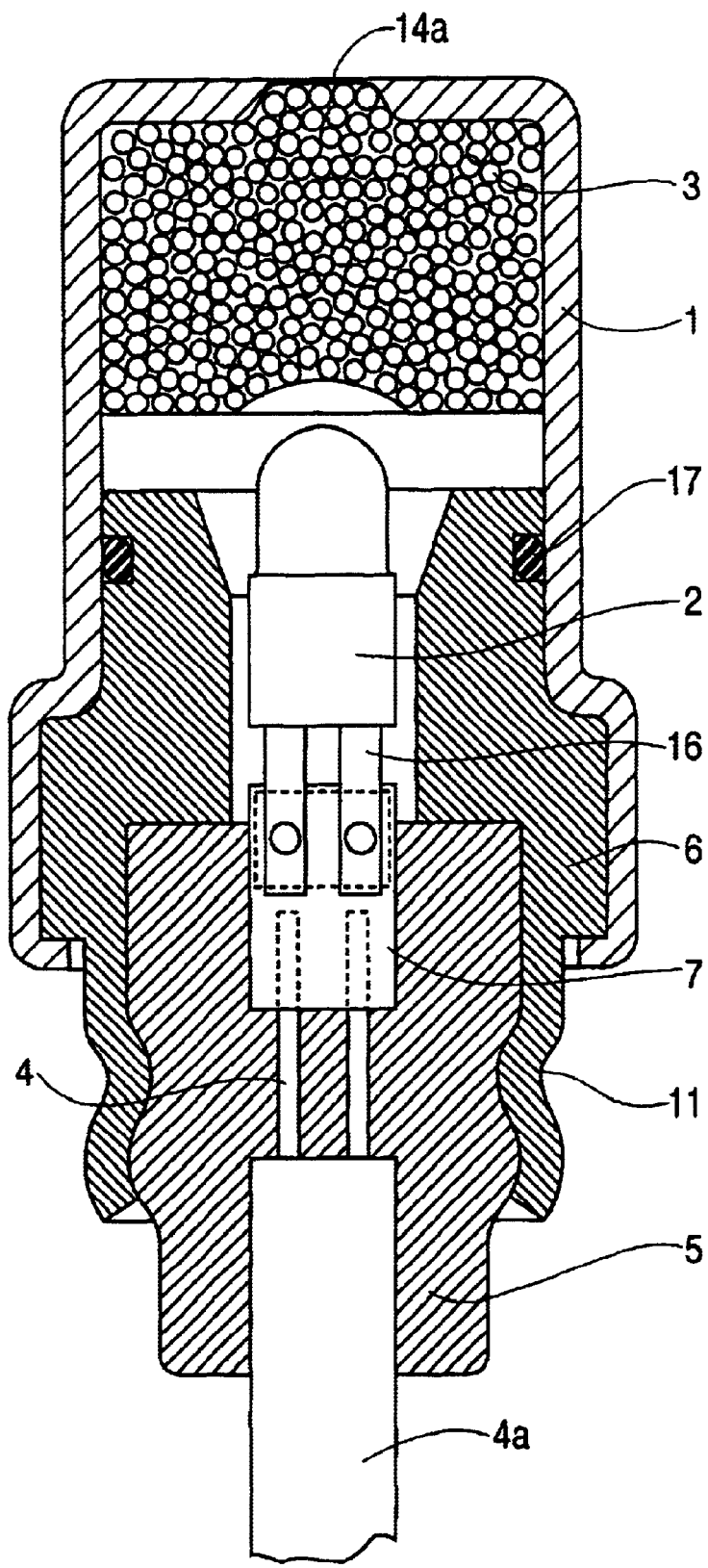
FIG. 2 shows, in section, an alternative embodiment with a special holding element.

FIG. 2 shows an alternative embodiment of the gas generator in accordance with the invention. The igniter 2, here likewise an ignition cap, is embedded in a holding element 6. This holding element 6 is sealed in relation to the housing 1 by way of a sealing ring 17. A stopper 5, through which the cable 4a is guided, is embedded in the holding element 6 in a manner analogous to that of the embodiment in accordance with FIG. 1.

Individual wires, composite wires, cable conductors or a whole variety of cable designs are meant by the term connecting wires or pins or cables.

The stopper 5 in this embodiment is accordingly surrounded in a sealing manner by the holding element 6. The connection is again achieved by crimping 11. As in the embodiment in accordance with FIG. 1, here, too, a printed circuit board 7 is provided as a connecting element between the cable 4a or the connecting wires 4 and the connecting laminae 16. Again a propellent charge 3 is introduced above the igniter 2. A predetermined breaking point 14a ensures that there is a defined break-up of the housing 1.

Figure 3:
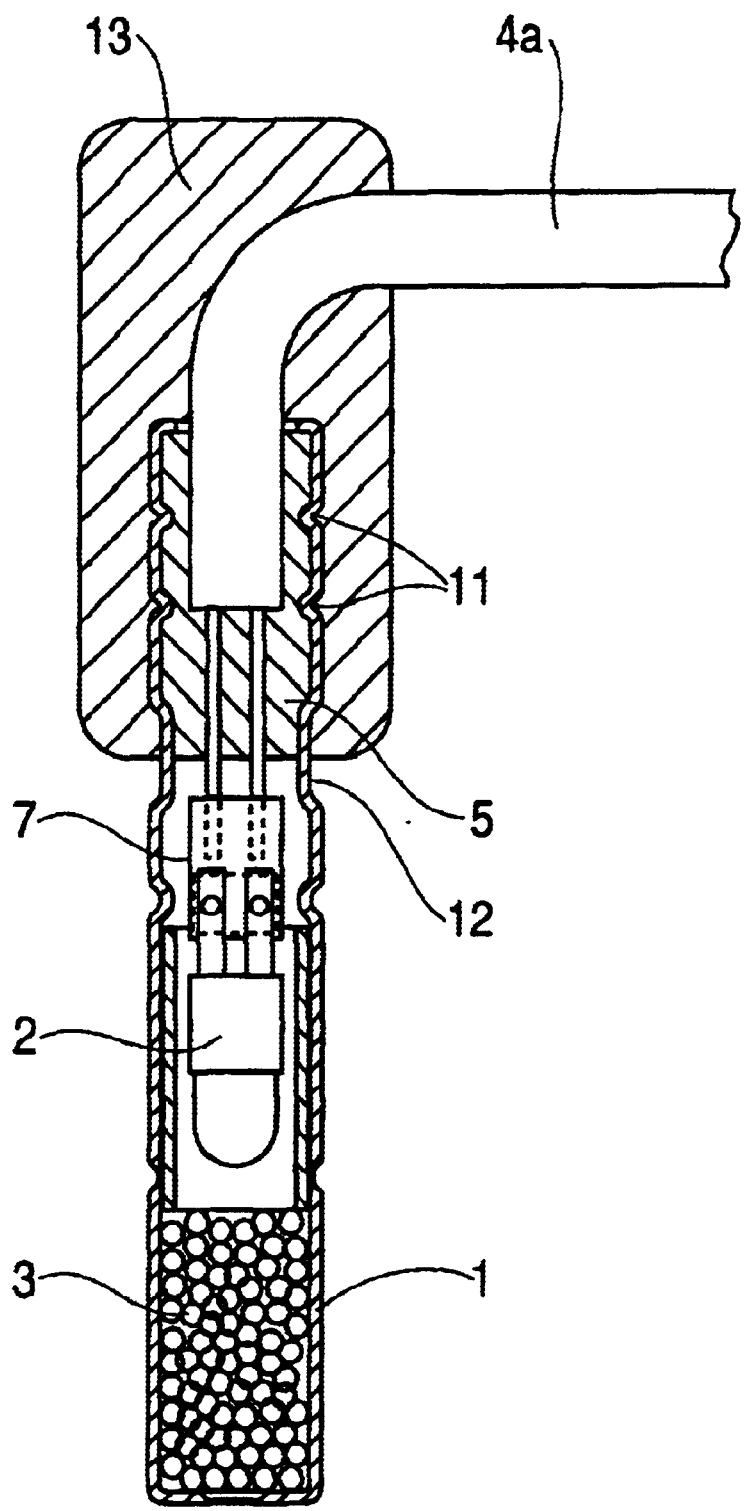
FIG. 3 shows an embodiment, which is similar to that of FIG. 1, with a cable guide set thereon.

FIG. 3 shows a similar embodiment to that shown in FIG. 1, but a cable guide 13 is provided at the end face of the housing 1, where the cable 4a is inserted. It is also possible to insert the cable 4a into the housing 1 at a given angle with the aid of this cable guide 13, 90° being shown as an example in FIG. 3. The cable guide 13 can, for example, be plugged, adhered or sprayed thereon. The cable guide 13 can additionally be used as strain reliever.

FIGS. 4, 5, 6 show, in each case in a diagrammatic manner, the printed circuit board 7 with connecting wires 4 and igniter 2 soldered thereon. In FIG. 4 a coil 8, in FIG. 5 a capacitor 9 and in FIG. 6 an active or passive circuit arrangement 10 is arranged on the printed circuit board 7 as EMC-protection. This active or passive circuit arrangement 10 can also be used for other purposes rather than just for the purpose of protecting against electromagnetic action; for example, as a switch or a safety element.

Figure 7:
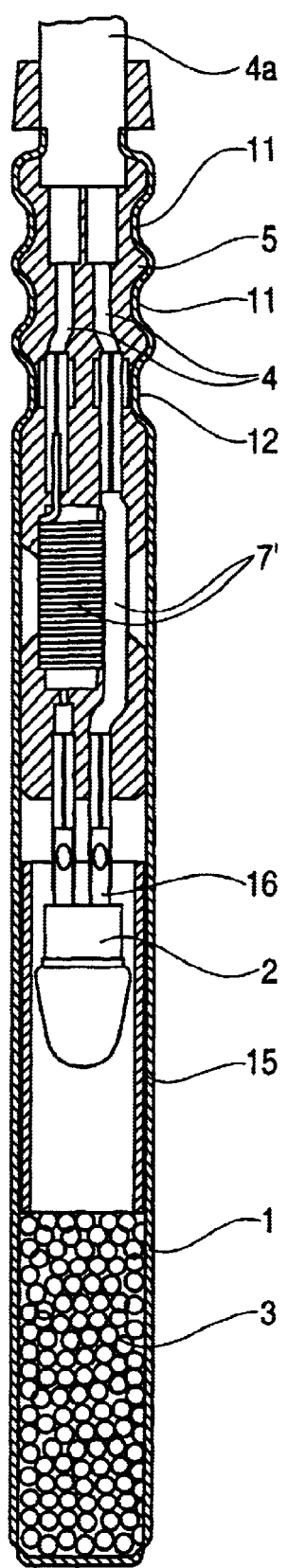
FIG. 7 shows, in section, an alternative embodiment with an electronic component as a connecting element between the igniter and the connecting wires or pins.

Electronic components can be arranged in the interior of the housing as a connecting element or as connecting elements between the igniter and the connecting wires or pins. FIG. 7 shows such a structure in which the igniter 2, e.g., an ignition cap, projects into the insulating sleeve 15 and is located upstream of the propellant charge 3. The electrical connecting bars 16 of the igniter 2 are connected to the connecting wires 4 via an electronic component, e.g., a coil 7'.

What is claimed is:

1. Gas generator for a safety device for motor vehicles, comprising:
   a housing having predetermined breaking points to allow for a defined break up of the gas generator,
   a propellant charge provided in the housing for generating a pressurized gas for activating the safety device,
   an igniter located in the housing for igniting the propellant charge,
   an electrical connection for electrically connecting the igniter to a control device located outside the gas generator, the electrical connection being guided via a stopper into the housing and sealed thereby, the stopper being surrounded in sealing fashion by the housing itself or by a retaining element connected to the housing in a sealing fashion, and
   a printed circuit board arranged in the interior of the housing as a connecting element between the igniter and the electrical connection.

2. Gas generator according to claim 1, characterised in that protection against electromagnetic action is arranged on the printed circuit board.

3. Gas generator according to claim 2, characterised in that the stopper is connected to the housing by crimping.

4. Gas generator according to claim 2, characterised in that the stopper is provided on the electrical connection by one of pushing, spraying and vulcanizing.

5. Gas generator according to claim 2, characterised in that the igniter is an ignition cap.

6. Gas generator according to claim 2, characterised in that the housing has an inwardly directed channel formation as a spark gap.

7. Gas generator according to claim 2, characterised in that a cable guide is arranged at the end face of the gas generator at which connecting wires or pins or a cable are inserted.

8. Gas generator according to claim 2, characterised in that the predetermined breaking points are provided on at least one of a base and a housing wall of the housing.

9. Gas generator according to claim 2, characterised in that the stopper comprises a material selected from the group consisting of synthetic rubber and plastic.

10. Gas generator according to claim 1, characterised in that the propellant charge consists essentially of nitrocellulose.

11. Gas generator according to claim 1, characterised in that the propellant change does not generate carbon monoxide.

* * * * *